June 7, 1938.  E. M. GRIFFITH  2,119,635
PROTECTIVE DEVICE FOR VEHICLE WINDOWS
Filed Dec. 16, 1936

INVENTOR
Edward M. Griffith
By Danur L. Wood
ATTORNEY

Patented June 7, 1938

2,119,635

UNITED STATES PATENT OFFICE 2,119,635

PROTECTIVE DEVICE FOR VEHICLE WINDOWS

Edward M. Griffith, Albany, N. Y.

Application December 16, 1936, Serial No. 116,138

3 Claims. (Cl. 296—44)

While my invention is more particularly intended for use with vehicle windows and will be described in connection therewith, it is to be understood that it is not necessarily limited thereto.

Vehicle windows of a comparatively recent type which are pivoted about a substantially vertical axis and are swung about said axis to provide ventilation present the difficulty of creating a draft at the forward end of the window which draws into the vehicle not only desired air for ventilating purposes, but foreign matter such as rain, insects, and the like which impinge against the window during the forward movement thereof to the annoyance of the occupants of the car. Air is also drawn into the vehicle beneath the rear lower edge of the window which carries with it into the vehicle foreign matter of the character above indicated.

One of the objects of my invention is the provision of a guard in the form of a protective plate which is secured to the front lower edge of the window and which extends along at least a portion of the forward edge thereof and outwardly away from the window to form a gutter which serves to receive such foreign matter as may impinge against the forward portion of the window and conduct it to a point where it is discharged.

A further object of my invention is the provision of a shield secured to the rear lower edge of the window, and which prevents any foreign matter, such as water, from being drawn into the car beneath the lower rear edge of the window. Such shield cooperates with the gutter forming plate in advance thereof in that it prevents any rain or other foreign matter which is carried along the gutter from being carried into the car by the draft that is created beneath the rear lower edge of the window.

Other objects of my invention will appear in the specification, and the novel features thereof will be more particularly pointed out in the claims.

My invention will best be understood by reference to the accompanying drawing in which I have illustrated a preferred embodiment thereof and in which Fig. 1 is a side view of an automobile provided with a window opening and a window mounted therein and having the guard and shield embodying my invention attached thereto;

Like reference characters indicate like parts throughout the drawing.

Figure 1:
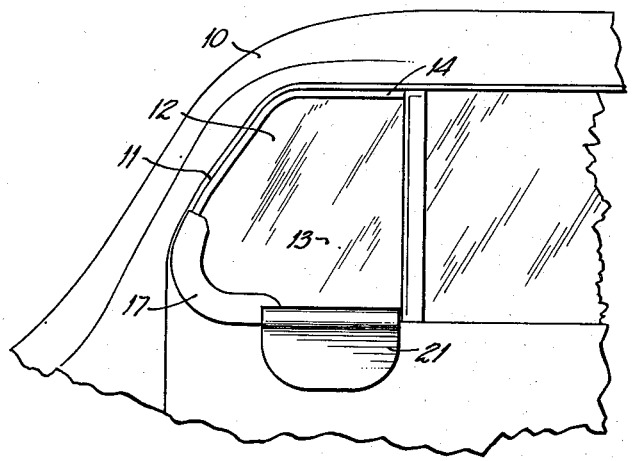

Referring to the drawing, 10 is an automobile body in connection with which I have illustrated my invention, the automobile being provided with a window opening 11 in which is pivotally mounted a window indicated generally at 12 and comprising a pane 13 which is surrounded at its upper, lower and front edges by a frame 14, a pad 15 of suitable material preferably being interposed between the pane and frame to prevent rattling of the window and injury to the pane. In the embodiment of my invention illustrated the window is pivotally mounted about a substantially vertical axis intermediate of the window, the pivots for the window being indicated at 16. The window is rotated in a direction to move the front end of the window inwardly and the rear end thereof outwardly when it is desired to ventilate the car, a draft being created which moves inwardly past the front end of the window, and outwardly past the rear thereof. In windows of this type, a draft is also created which moves beneath the lower rear edge of the window into the car.

As stated, windows of the foregoing character encounter rain and other foreign material such as insects when the vehicle is moving forwardly and they are carried into the car along with the natural air current that is purposely induced. The water which finds its way into the vehicle wets the occupants of the vehicle while insects and other foreign objects which are also drawn into the vehicle by the air currents are impelled forcibly against the bodies of the occupants of the vehicle to their annoyance and they are liable to cause injury to the eyes.

In accordance with my invention, a guard, formed of a protective plate 17 is mounted on the front lower edge and at least the lower forward edge of the window which receives any rain or other foreign matter which may impinge against the forward portion of the window, and which conducts the same to a point where they will be discharged without finding access to the interior of the car.

I am aware that it has hitherto been proposed to provide a guard to prevent access of foreign matter to the front portion of a vehicle window, and I do not claim this feature broadly. In such device, however, it has been proposed to secure the member between the window frame and the window pane with the consequence that the window frame must be sufficiently large in cross section to accommodate the edge of the guard which is mounted therein, and with the further disadvantage that the guard is not readily detachable from the window.

Figure 4:
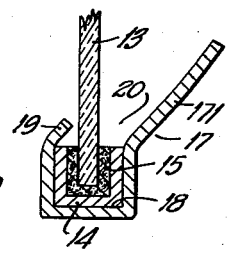
Fig. 4 is a section taken along the line 4—4 of Fig. 2 looking in the direction of the arrows.
Figure 3:
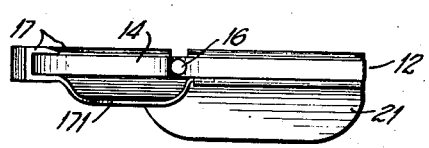
Fig. 3 is a plan view of Fig. 2.

In accordance with my invention the foregoing difficulties are avoided by forming one edge of the guard member with a groove 18 the walls of which are formed of resilient material, the groove being of a size to engage snugly the frame of the window. Preferably, the wall of the guard member is provided with a re-entrant portion or portions which overlie the frame of the window as illustrated in Fig. 4 which serves normally to maintain the guard member firmly in position on the frame but which may readily be attached thereto and detached therefrom. A short inwardly turned flange 19 engages an edge of the frame and serves to retain the guard in position on the frame. The opposite free edge 171 of the plate 19 is turned outwardly away from the window thereby forming with the window pane a gutter 20 which serves to receive any rain or other foreign matter which impinges against the front portion of the window and conducts it to the rear portion thereof adjacent to the pivotal point of the window where it is discharged without danger of its reaching the interior of the vehicle.

Figures 5, 6:
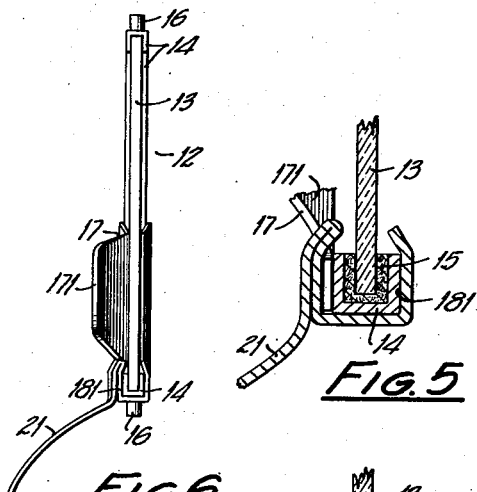
Fig. 5 is a section taken along the line 5—5 of Fig. 2 looking in the direction of the arrows.
Fig. 6 is an end view taken at the right of Fig. 2.

In accordance with my invention, a shield 21 in the form of a second protective plate is also secured to the lower rear edge of the window for preventing access of foreign matter beneath the rear portion of the window to the interior of the vehicle. The shield is preferably formed of a single metal sheet the inner edge of which is formed with a groove 181 which is preferably of the same shape as that of the guard member, except for the fact that the walls are re-entrant at both sides of the window frame and overlie the same as best illustrated in Fig. 5 and is adapted to receive and engage the window frame 14 in the same manner as does the guard. The plate forming the guard is preferably bent back upon itself along the left hand wall thereof as viewed in Fig. 6 and from the lower edge of the fold the shield extends outwardly away from the frame preferably an amount just sufficient to engage the door of the automobile when the car window is closed and present a neat and attractive appearance. It will be apparent that the shield 21 prevents any foreign matter which is collected by and carried along the gutter 20 from being carried into the car beneath the rear portion of the window as well as any such foreign objects which may impinge against the rear portion of the window 12. The free edge of the shield 21 may, if desired, be provided with a pad such as rubber to prevent possible marring of the door of the vehicle and to form a tighter joint therewith.

Figure 2:
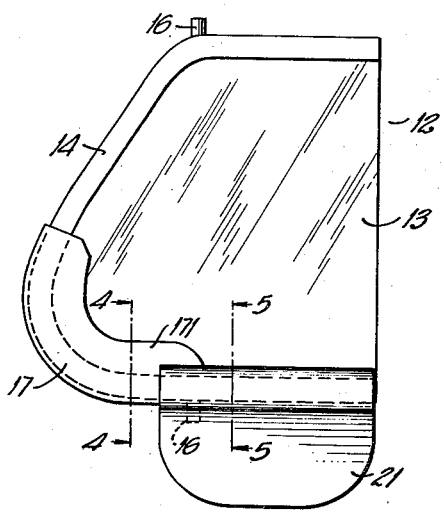
Fig. 2 is a side view of the window removed from the vehicle.

To assemble the parts, it is only necessary to snap the guard 17 into position over the window frame 14 to the position indicated in Fig. 4, and then either snap the shield 21 over the frame 14 adjacent to the guard or slide the same over the frame from the right hand end thereof as viewed in Fig. 2.

While I have described my invention in its preferred embodiment it is to be understood that the words which I have used are words of description rather than of limitation and that changes within the purview of the appended claims may be made without departing from the true scope and spirit of my invention in its broadest aspects.

What I claim is:

1. The combination with a vehicle body provided with a window opening, of a window pivotally mounted in said opening about a substantially vertical axis located at an intermediate portion thereof, a plate attached to the lower and forward edge of said window and extending at its free edge outwardly away from said window to form a gutter for the reception of and for conducting away any foreign material which impinges against the forward end of said window, and a shield secured to the lower edge of said window at the rear of said pivot and extending outwardly and downwardly away from said window for conducting any material which is received in said gutter outwardly away from the lower edge of said window.

2. The combination of a vehicle body provided with a window opening, a window pivotally mounted in said window opening about a substantially vertical axis, a protective plate detachably secured at one edge to the lower edge and at least a portion of the forward edge of said window and extending outwardly away from said window, and a second plate detachably secured to the lower edge of said window and extending outwardly and downwardly therefrom.

3. The combination of a vehicle body provided with a window opening, of a window pivotally mounted in said opening about a substantially vertical axis intermediate the ends of said window, a first protective plate secured to the lower edge of said window in advance of said pivot and along at least a portion of the forward edge of said window, said plate extending outwardly away from said window to form a gutter, and a second protecting plate secured to the lower edge of said window at the rear of said pivot and extending outwardly and downwardly away from said window, the gutter of said first protecting plate discharging against the outwardly and downwardly extending portion of said second protecting plate.

EDWARD M. GRIFFITH.